March 24, 1959 L. DECKER 2,878,641
THERMAL GRAVITY MOTOR
Filed April 8, 1957 3 Sheets-Sheet 1

INVENTOR.
LAMBERT DECKER
BY J. Ledermann
ATTORNEY

March 24, 1959

L. DECKER 2,878,641

THERMAL GRAVITY MOTOR

Filed April 8, 1957

INVENTOR:
LAMBERT DECKER

BY F. Ledermann

ATTORNEY

March 24, 1959 L. DECKER 2,878,641
THERMAL GRAVITY MOTOR
Filed April 8, 1957 3 Sheets-Sheet 3
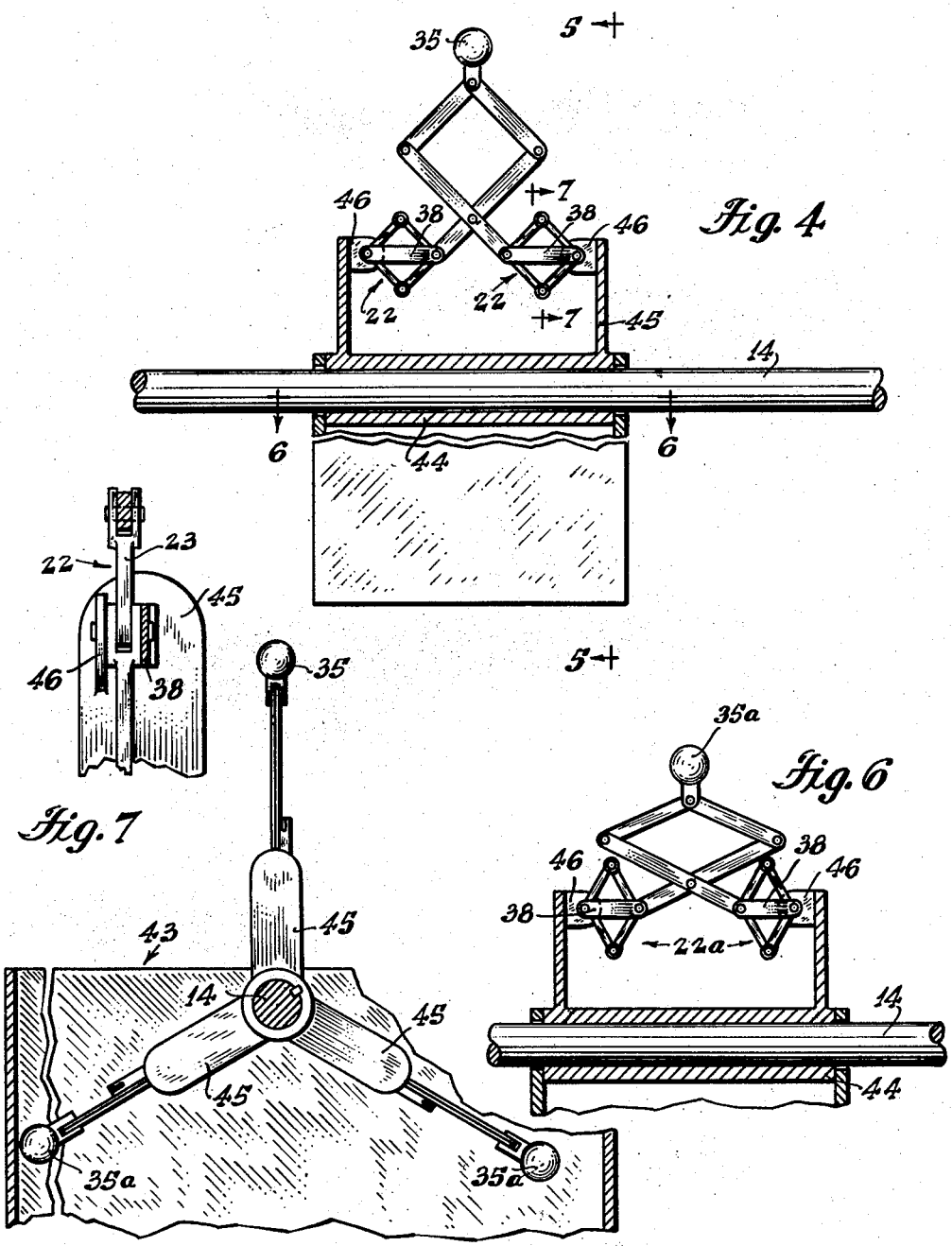
INVENTOR.
LAMBERT DECKER
BY J. Lederman
ATTORNEY

United States Patent Office 2,878,641
Patented Mar. 24, 1959

2,878,641

THERMAL GRAVITY MOTOR

Lambert Decker, Ulster Park, N.Y.

Application April 8, 1957, Serial No. 651,489

2 Claims. (Cl. 60—10)

This invention relates to motors and, more particularly, a motor that is adapted to transform heat energy into mechanical energy.

Various types of thermal motors have been provided for converting various forms of heat energy into mechanical motion. However, many of these motors have lacked sufficient power to perform useful work and in many cases have required expensive installations that far outvalued the benefits obtained. Accordingly, it is an object of the present invention to provide a thermal type motor that is simple in construction, efficient in operation, and which enlists the aid of gravity to produce a substantially constant rate of rotation and power output.

It is another object of the present invention to provide a thermal gravity motor that may be used to convert the heat rays of the sun into a useable amount of mechanical energy and which requires the use of a minimum number of moving parts.

A still further object of the present invention is to provide a thermal responsive gravity motor that may be constructed, of any desired size to produce substantially any quantity of mechanical energy from the rays of the sun or any other heat source and which requires a minimum amount of maintenance.

Still a further object of the present invention is to provide a thermal gravity motor that is constructed from a minimum number of parts, is readily accessible for repair and maintenance purposes, and which is substantially foolproof to convert any form of heat energy into useful mechanical energy.

All of the foregoing and still further objects and advantages of this invention will become apparent from a study of the following specification, taken in connection with the accompanying drawing, wherein:

Figure 4 is a view similar to Figure 2, showing a modified form of the present invention;

Figure 5 is an enlarged fragmentary transverse cross sectional view taken along line 5—5 of Figure 4;

Figure 6 is a transverse cross sectional view taken along line 6—6 of Figure 4; and Figure 7 is an enlarged fragmentary cross sectional view taken along line 7—7 of Figure 4.

Figure 1:
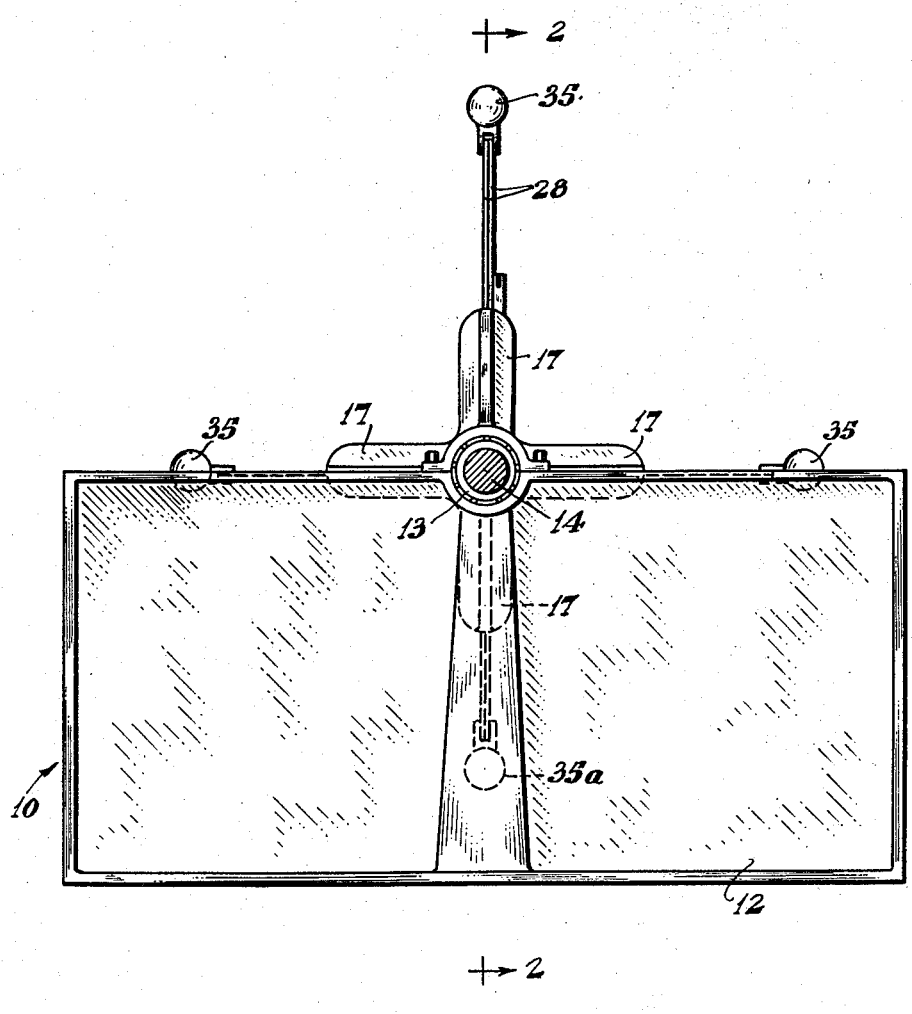
Figure 1 is a side elevational view of a thermal gravity motor made in accordance with one form of the present invention, in operative use.
Figure 2:
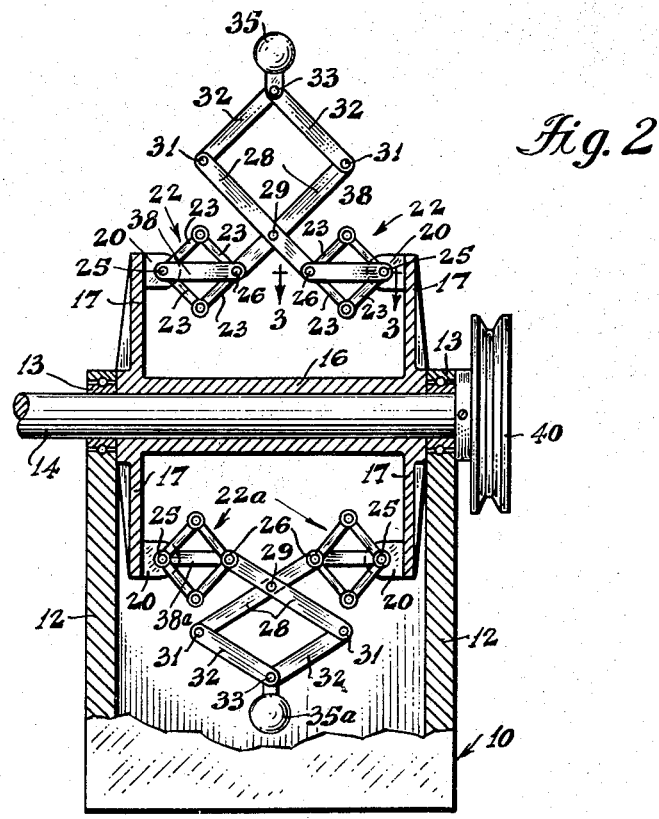
Figure 2 is a transverse cross sectional view taken along line 2—2 of Figure 1.
Figure 3:
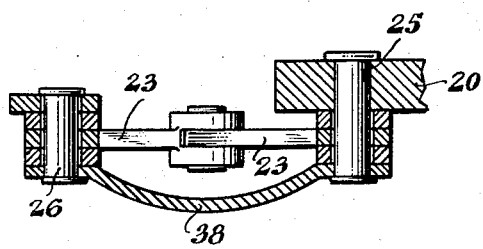
Figure 3 is an enlarged cross sectional view taken along line 3—3 of Figure 2, showing the details of certain elements thereof.

Referring now to the drawing, and more particularly to Figures 1 to 3 thereof, a thermal gravity motor made in accordance with one form of the present invention is shown to include a cubical housing 10, having spaced side walls 12. Each of the side walls 12 is provided with a ball bearing assembly 13 which rotatably supports a transversely extending shaft 14. The central portion of the shaft 14 is substantially completely enclosed by a tubular sleeve 16 that has four perpendicularly extending arms 17 at each end. All of the arms 17 are of substantially identical length and shape, and are equally spaced apart so that exact balance may be maintained. The arms 17 are also arranged in pairs, one at each end of the sleeve 16.

As is more clearly shown in Figure 2, a bracket 20 extends inwardly from each of the arms 17 for supporting a linkage assembly of adjustable length. This linkage includes a pair of link sets 22 that extend between each pair of arms 17. Each link set 22 is constructed from a plurality of substantially equal links 23 that are connected together at each end to form a parallelogram of adjustable size and configuration. A pivot pin 25 in one corner of each link set 22 is rigid with the bracket 20 and the adjacent links 23 are pivoted thereon, while the diagonally opposite corner of each set, which is provided with a pivot pin 26, extends toward the transverse central plane of the shaft 14. An auxiliary link set is connected between the adjacent inside corners 26 of each pair of link sets 22 through the extended ends of a pair of elongated links 28 that are pivotally connected by means of a pivot pin 29 intermediate their ends. The free ends of each of the elongated links 28 are connected to shorter additional links 32, by means of pivot pins 31 to form a parallelogram linkage unit. The outer ends of the additional links 32 are connected together by another pivot pin 33 which also secures a dead weight element 35 thereto. It will thus be recognized that relative movement between the diagonally opposite corners 25, 26, of the link sets 22 is operative to adjust the distance between the weight 35 and the longitudinal axis of the shaft 14. Any such adjustment of one arm assembly relative to the other arm assemblies will, of course, unbalance the weight distribution of the system. In the event that one of the arm assemblies is actuated to extend its associated weight 35 outwardly from the normal position relative to the longitudinal axis of the shaft 14 when it is in an upper position, this shift of the center of gravity of that arm will effect a partial rotation of the shaft 14.

Heat responsive means in the form of a metallic element 38 is associated with each link set 22 and is rigid at one end with the pin 25; it extends to and is pivoted to diagonally opposite corner 26 thereof. Thus, in response to the application of heat, the metallic element 38 will expand, thus urging the corners 25, 26, apart, and consequently moving the weight 35 outwardly from the longitudinal axis of the shaft 14. In operation, the upper portion of the housing 10 is exposed to the rays of the sun or any heat source, while the bottom thereof is substantially shielded from those rays. Thus, the heat acting upon the upwardly disposed metallic elements 38 automatically adjust the location of the center of gravity of that particular arm assembly to unbalance the system and thus rotate the shaft 14. During this rotation, the uppermost arm assembly will descend, thus raising the next adjacent arm assembly from within the housing so that the heat rays may sequentially act thereupon. As the extended arm assembly approaches the interior of the housing 10, the absence of heat automatically contracts the metallic elements so that the extended arm assembly is drawn inwardly by the distorted link sets 22a so that the weight 35a shifts the center of gravity of that particular arm assembly closer to the longitudinal axis of the shaft 14. Thus, the uppermost arm assembly will be adjusted by the expansion of the metallic element 38 in response to the rays of heat so that this rotation of the shaft will continue indefinitely. Of course, the heat energy is converted into the mechanical form of energy as represented by the rotation of the shaft which also includes a power take off pulley 40 for transmitting the energy to any desired machine.

In Figures 4 to 7, a modified form of motor 47 is shown wherein a sleeve 44 is provided with three equally spaced arm assemblies 45 instead of the four similar assemblies hereinbefore described. Each of these arms 45 is provided with an inwardly extending bracket 46 for securing the respective link sets 22 in the aforementioned manner. The operation of this embodiment of the invention is similar to that described in connection with the device shown in Figures 1 to 3, the conversion of heat energy to mechanical energy being accomplished through the automatic adjustment of the length of the arm assemblies relative to the longitudinal axis of the shaft 14 by the action of heat applied to the metallic elements 38.

It will be recognized that any form of heat, such as the rays of the sun, waste heat, or manufactured heat, may be used to effect the rotation of the output shaft 14. Similarly, any form of shade may be provided to effect the necessary contraction of the extended metallic elements, such as utilizing natural shade or shadows or a liquid coolant. If desired, additional link sets or longer link arms may be used to magnify the shift in the center of gravity of each arm assembly so that a more even and uniform rotation may be obtained. The metallic elements 38 are preferably constructed of a metal having a high coefficient of expansion so that the machine is very sensitive to any change in temperature. In operation, each arm assembly alternately expands and contracts as the shaft revolves at a rate that is substantially proportional to the temperature differential between the exposed and shielded parts of the device.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A thermal gravity motor comprising a hollow housing mounted on a base and open at the top, the housing including opposed side walls, a horizontal shaft rotatably mounted in said side walls near the top thereof, said shaft having two longitudinally spaced sets of circumferentially equidistantly spaced identical radial arms extending therefrom, each of said sets being positioned in a plane positioned between said side walls, each of the arms of one of said sets lying in a common plane with one of the arms of the other of said sets and constituting therewith a pair of longitudinally spaced arms, each of said pair of arms having one end of a heat sensitive element rigid with the outer end thereof and at right angles to the arm, the element on one arm of the pair extending toward the element on the other arm of the pair and being aligned therewith, two elongated links of equal length pivoted together at a point near but spaced from one end of the links thereby providing link extensions at said end thereof, the extremities of said link extensions being pivoted to the other ends of said elements with the links positioned in the same radial plane as the elements and extending radially outward, two additional links of equal length pivoted together at one end, the other ends of said additional links being pivoted to the other ends of said first-named links and lying in the same plane as the first-named links and extending radially outward, and a weight secured to said additional links at the mutual pivot point thereof.

2. A thermal gravity motor according to claim 1, having a pin extending through each of the ends of said elements, each of said elements having a parallelogram of links pivoted end-to-end associated therewith, diagonally opposite corners of the parallelogram being pivoted to said pins.

References Cited in the file of this patent

UNITED STATES PATENTS

| 736,671 | Aksila | Aug. 18, 1903 |
| 1,797,092 | Kearney | Mar. 17, 1931 |
| 2,722,613 | Culbertson et al. | Nov. 1, 1955 |

FOREIGN PATENTS

| 591,725 | France | Apr. 16, 1925 |
| 137,424 | Germany | Dec. 19, 1902 |